United States Patent
Gusler et al.

(10) Patent No.: US 7,072,684 B2
(45) Date of Patent: Jul. 4, 2006

(54) METHOD, APPARATUS AND COMPUTER PROGRAM PRODUCT FOR TRANSCRIBING A TELEPHONE COMMUNICATION

(75) Inventors: Carl Phillip Gusler, Austin, TX (US); Rick Allen Hamilton, II, Charlottesville, VA (US); Stephanie Elise Woods, Pearland, TX (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/260,636

(22) Filed: Sep. 27, 2002

(65) Prior Publication Data

US 2004/0204115 A1 Oct. 14, 2004

(51) Int. Cl.
*H04B 1/38* (2006.01)
*H04M 1/00* (2006.01)

(52) U.S. Cl. .............................. 455/550.1; 455/412.1; 455/419; 455/566

(58) Field of Classification Search ................ 455/563, 455/412.1, 412.2, 413, 414.1, 414.4, 418, 455/419, 556.1, 466, 564, 556.2, 557, 550.1, 455/566, 90.1
See application file for complete search history.

(56) References Cited

U.S. PATENT DOCUMENTS

| | | | |
|---|---|---|---|
| 4,975,957 A | 12/1990 | Ichikawa et al. | 381/36 |
| 5,081,668 A | 1/1992 | Ito | 379/58 |
| 5,249,217 A | 9/1993 | Lee | 379/58 |
| 5,477,511 A | 12/1995 | Englehardt | 369/25 |
| 5,583,915 A | 12/1996 | Ishida | 379/58 |
| 5,740,543 A | 4/1998 | Maeda | 455/550 |
| 5,768,349 A | 6/1998 | Knuth et al. | 379/88 |
| 5,774,857 A | 6/1998 | Newlin | 704/271 |
| 5,926,524 A | 7/1999 | Taylor | 379/88.08 |
| 6,021,325 A | 2/2000 | Hall | 455/412 |

(Continued)

OTHER PUBLICATIONS

U.S. Appl. No. 10/183,860, filed Jun. 26, 2002, pending.

(Continued)

*Primary Examiner*—Tilahun Gesesse
*Assistant Examiner*—John J. Lee
(74) *Attorney, Agent, or Firm*—Anthony V. S. England; Leslie Van Leeuwen; David A. Mims

(57) ABSTRACT

According to an apparatus form of the invention, an apparatus of a size and weight that is suitable to be carried easily in a pocket or purse includes telecommunications circuitry operable to wirelessly send and receive voice communications directly to and from a cell phone network. The apparatus also has a processor communicatively coupled to the telecommunications circuitry for receiving the voice communications. A memory of the apparatus has program instructions for speech recognition stored therein and the processor is operable under control of the speech recognition program instructions to generate a transcript of the voice communications. The apparatus also includes a display and the memory has program instructions for a display function stored therein. The processor is operable under control of the display program instructions to project the transcript on the display.

19 Claims, 3 Drawing Sheets

U.S. PATENT DOCUMENTS

| | | | |
|---|---|---|---|
| 6,032,053 A | 2/2000 | Schroeder et al. | 455/553 |
| 6,073,103 A | 6/2000 | Dunn et al. | 704/276 |
| 6,101,241 A | 8/2000 | Boyce et al. | 379/88.01 |
| 6,151,576 A | 11/2000 | Warnock et al. | 704/260 |
| 6,173,259 B1 | 1/2001 | Bijl et al. | 704/235 |
| 6,215,992 B1 | 4/2001 | Howell et al. | 455/412 |
| 6,222,909 B1 | 4/2001 | Qua et al. | 379/88.22 |
| 6,278,772 B1 | 8/2001 | Bowater et al. | 379/88.13 |
| 6,304,573 B1 | 10/2001 | Hicks, III | 370/401 |
| 6,308,151 B1 | 10/2001 | Smith | 704/235 |
| 6,349,132 B1 | 2/2002 | Wesemann et al. | 379/88.17 |
| 6,449,496 B1 * | 9/2002 | Beith et al. | 455/563 |
| 2002/0160751 A1 * | 10/2002 | Sun et al. | 455/412 |
| 2004/0202291 A1 * | 10/2004 | Skinner | 455/412.1 |
| 2004/0203610 A1 * | 10/2004 | Deeds | 455/412.1 |

OTHER PUBLICATIONS

U.S. Appl. No. 10/183,792, filed Jun. 26, 2002, pending.

Cohen et al., "Portable Voice Messaging System", IBM Technical Disclosure Bulletin, vol. 38, No. 07, Jul. 1995, pp. 257-259.

"The cellular phone which has answering functions by pushing its buttons", IBM Research Disclosure 433140, May 2000, p. 946.

Padmanabhan, et al., "Automatic Speech Recognition Performance on a Voicemail Transcription Task", IBM Research Report, RC22172 (W0109-014), Sep. 14, 2001, pp. 2-11.

U.S. Appl. No. 09/692,391, filed Oct. 19, 2000, Bhogal et al.

* cited by examiner

METHOD, APPARATUS AND COMPUTER PROGRAM PRODUCT FOR TRANSCRIBING A TELEPHONE COMMUNICATION

CROSS-REFERENCE TO RELATED APPLICATIONS

This application is related to the following applications, which have common inventorship and are assigned to the same assignee as the present application and are hereby incorporated herein by reference:

METHOD, APPARATUS AND COMPUTER PROGRAM PRODUCT FOR AUTHORIZING RE-RECORDING, filed Jun. 26, 2002 application Ser. No. 10/183,860; and METHOD, APPARATUS AND COMPUTER PROGRAM PRODUCT FOR AUTHORIZING RECORDING OF A MESSAGE, filed Jun. 26, 2002, application Ser. No. 10/183,792.

BACKGROUND

1. Field of the Invention

This invention concerns transcribing spoken communication, and more particularly concerns transcribing a telephone communication.

2. Related Art

In recent years there has been tremendous growth in telecommunications technology. Even though cell phone high-speed data services are only just beginning, there are reportedly already 130 million cell phones in use in the United States as of mid-2002. The Cellular Telecommunications and Internet Association, a trade group, reports that in the year 2002 billable cell phone calling will exceed half a trillion minutes. Due to the nature of their use, it is particularly useful to include in cell phones message handling functionality. Another message handling telecommunications technology, voicemail, predates the mass proliferation of cell phones, but the use of voicemail continues to rapidly increase. Despite the spread of cell phones and voicemail, there has not been a correspondingly great increase in user aids for managing these two telecommunications technologies. Consequently, a need exists for improving that management.

SUMMARY

The foregoing need is addressed in the present invention. According to an apparatus form of the invention, an apparatus of a size and weight that is suitable to be carried easily in a pocket or purse includes telecommunications circuitry operable to wirelessly send and receive voice communications directly to and from a cell phone network. The apparatus also has a processor communicatively coupled to the telecommunications circuitry for receiving the voice communications. A memory of the apparatus has program instructions for speech recognition stored therein and the processor is operable under control of the speech recognition program instructions to generate a transcript of the voice communications. The apparatus also includes a display and the memory has program instructions for a display function stored therein. The processor is operable under control of the display program instructions to project the transcript on the display.

In another aspect, the memory has program instructions for a transfer function and wherein the processor is operable under control of the transfer function program instructions to transfer the transcript for printing.

In a still further aspect, the memory has program instructions for a utility function stored therein, and the processor is operable under control of the utility program instructions to store a data structure for the transcript in the memory.

In yet another aspect, the processor is operable under control of the utility program instructions to store a data structure for the voice communications in the memory.

In another aspect, the memory has program instructions for an editing function stored therein, and the processor is operable under control of the editing program instructions to automatically selectively extract information from the transcript.

Objects, advantages, additional aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 2:
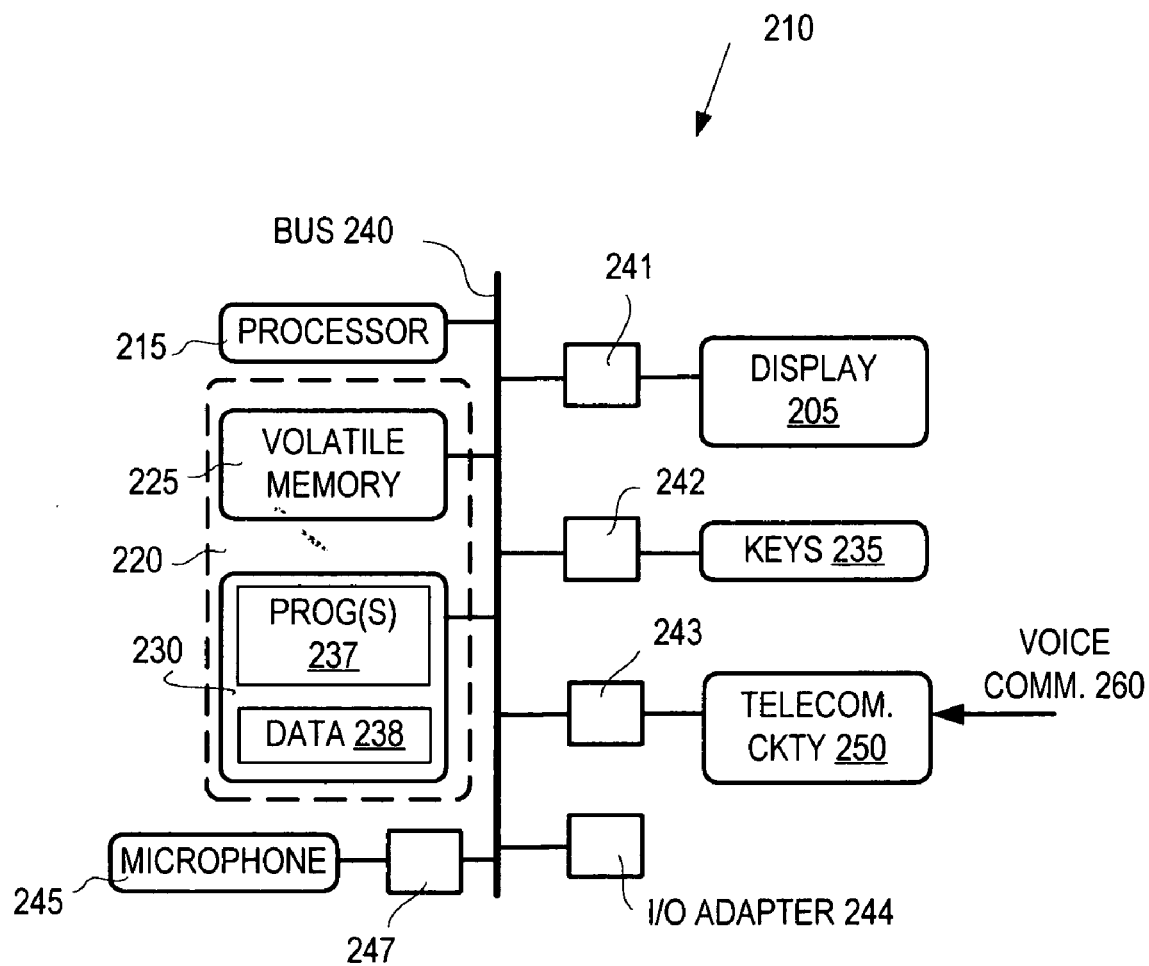
FIG. 2 illustrates structure of an apparatus of the present invention, according to an embodiment.

Referring first to FIG. 2, an apparatus 210 is shown, according to an embodiment of the present invention. The apparatus 210 is of a size and weight that is suitable to be carried easily in a pocket or purse. For example, in an embodiment the apparatus 210 is less than 7×4×1 inch in size and weighs less than 8 ounces. In contrast to a household telephone, the apparatus 210 includes telecommunications circuitry 250 operable to wirelessly send and receive voice communications directly to and from a cell phone network, for example, the Verizon Wireless or Sprint PCS networks. That is, the telecommunications circuitry 250 communicates wirelessly directly to a cell tower, for example, rather than through wires that a telephone service provider typically installs for home telephone service.

The apparatus 210 also includes a processor 215, a memory 220, which includes a volatile memory 225 (that is, random access memory, for example) and a nonvolatile memory 230 (for example, read only memory, hard disk, floppy disk, CD-ROM, etc.). The memory 220 is for storing a program or programs 237 for controlling the processor 215 and for storing data 238, described further herein below. Processor 215 is operative with the programs 237 to perform functions as described herein. The apparatus 210 also has a display 205 which receives a display signal from a display adapter 241.

The display 205 includes a touch-sensitive screen for receiving input from a stylus manipulated by a user. In this embodiment the system 210 also has keys 235, i.e., a keypad, buttons etc., which compose a collection of the sort that is sometimes referred to as a "data entry device." The system 210 also includes a microphone 245 for receiving voice commands. In other embodiments, the system 210 includes other data entry devices, and may or may not omit the keys 235, microphone 245, etc.

The components in the system 210 are generally interconnected by bus 240. Some of the components are connected to the bus 240 by adapters. The adapter 241 for display 205 has already been mentioned. Keys 235, microphone 245 and telecom circuitry 250 also are coupled to the bus 240 via respective adapters 242, 247 and 243. This interconnection of components permits them to communicate with one another. For example, the processor is communicatively coupled to the telecommunications circuitry 250 by means of the bus 240 and adapter 243 so that the processor 215 can receive voice communications 260 via the telecommunications circuitry 250. An input/output ("I/O") adapter 244 is also coupled to the bus 240 to enable transferring information among components of the apparatus 210 and external devices (not shown).

Apparatus 210 takes various configurations in different embodiments, each of which may generally be referred to as a "computer system." For example, in various embodiments the computer system may include a personal digital assistant ("PDA"), conventional telephone, cell phone, appliance with embedded processor and memory, etc. That is, it should be understood that the term "computer system" is intended to encompass any device having a processor that executes instructions from a memory medium.

The memory 220 preferably stores instructions (also known as a "software program" or simply "program") for implementing various embodiments of a method in accordance with the present invention. In various embodiments the one or more software programs are implemented in various ways, including procedure-based techniques, component-based techniques, and/or object-oriented techniques, among others. Specific examples include XML, C++ objects, Java and Microsoft Foundation Classes (MFC).

Figure 1:
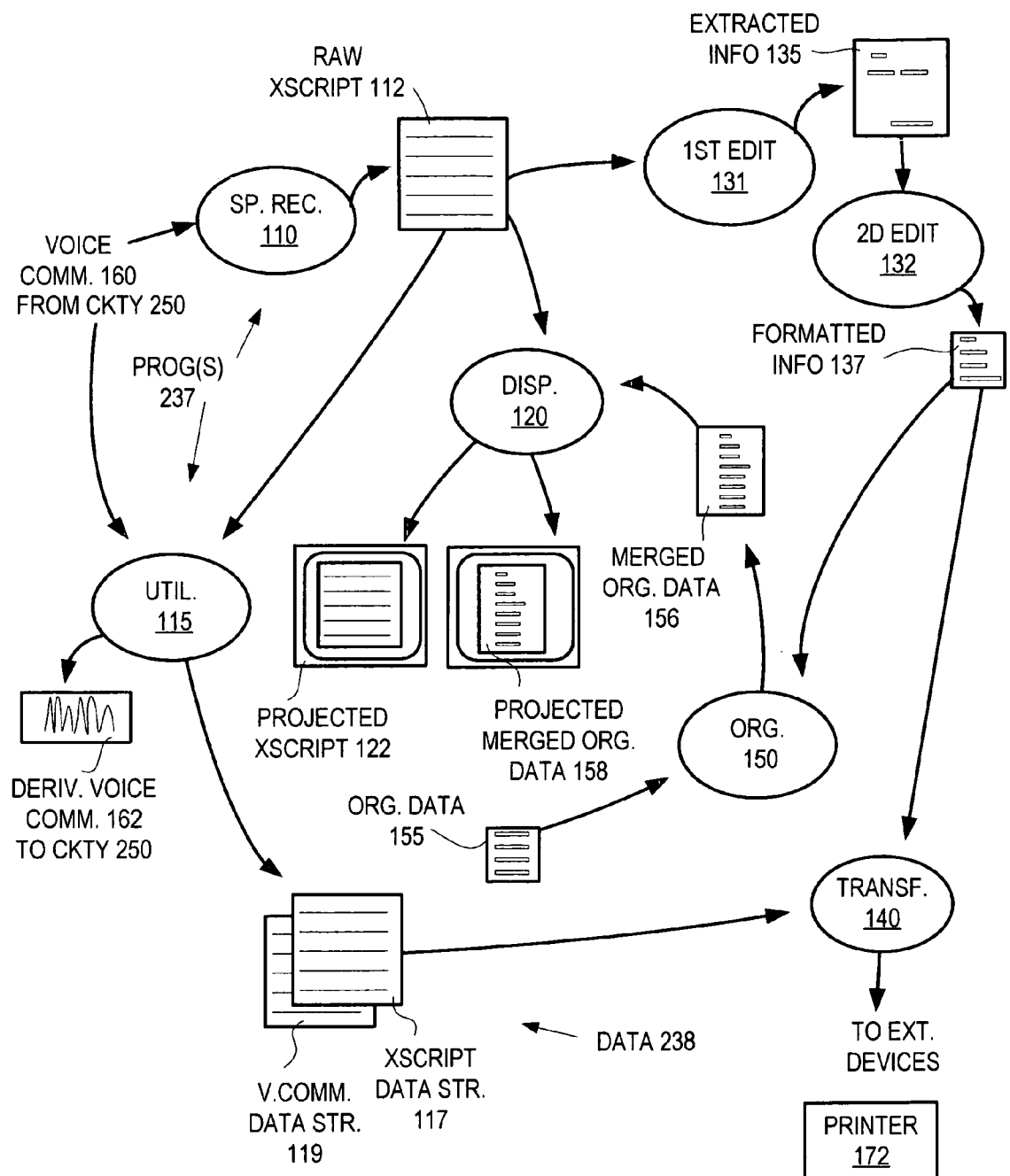
FIG. 1 illustrates certain functions and information flow for the present invention, according to an embodiment.

Referring now to FIG. 1, additional aspects, particularly functional aspects, of the present invention are illustrated, according to an embodiment. (Elements shown herein in more than one figure generally have like element numbers throughout.) The processor 215 (FIG. 2) receives voice communication 160 from the telecommunications circuitry 250 (FIG. 2). The voice communication 160 includes data that essentially reproduces, in a digital format, audio information from a spoken communication 260 (FIG. 2) received by telecommunictions circuitry 250. The processor 215 processes voice communication 160, under the control of a speech recognition function 110 portion of instructions for one or more programs 237, to generate a raw transcript 112 of the communication 160. The raw transcript 112 is text-based digital information, such as in the form of the well-known ASCII text.

Transcript 112 is in turn processed, under control of a utility function 115 portion of the instructions, to generate and save in memory 220 a data structure 117 for the transcript 112. Likewise, the voice communication 160 is processed, controlled by the utility function 115, to generate and save in memory 220 a data structure 119 for the voice communication 160. These data structures 117 and 119 are examples of data 238 shown in FIG. 1, and are formatted so as to be compatible with some other computer program function or external device.

The processor 215 is operable to transfer the data structures 117 and 119 externally via the I/O adapter 244 (FIG. 2) under control of a transfer function 140 portion of instructions for the program(s) 237. In the embodiment, the user may format the transcript data structure 117 for printing and may accordingly send the data structure 117 to an external printer 172 which prints the transcript 117. The user may also format the transcript data structure 117 in a format compatible with a word processing application and transfer it such as by sending the data structure 117 via the Internet, for example, by attaching it or otherwise associating it with an e-mail message, or uploading it to a storage area on a web site. The data structure 117 may also be transferred by other means, such as by infra-red beam, USB cable, etc. to some other computer system. The user may likewise format the voice communication data structure 119 in a standard format such as that of a ".wav" file compatible with a playback device, and likewise transfer it by sending the data structure 119 via the Internet or some other means.

Likewise, the voice communication 160 is processed, controlled by the utility function 115, to generate a derivative voice communication 162 which is transferred as an audio transmission to another telecommunications device via the telecommunications circuitry 250. This includes sending the voice communication 162 to a voice mail system, as described in the above cross referenced, related applications.

Convenience in transfer of data structure 117, data structure 119 or derivative voice communication 162 is enabled by commands invoked by predefined keys 235 (FIG. 2) or combinations of keys 235, selectable icons displayed on touch sensitive display 205 (FIG. 2) or predefined spoken words received by microphone 245 (FIG. 2) and recognized by speech recognition function 110.

Note that the user may select only pieces of the voice communication 160 to process and save as a transcript 112, derivative voice communication 162, transcript data structure 117, or voice communication data structure 119.

The processor 215 also processes the raw transcript 112 under control of a display function 120 portion of instructions for the program(s) 237 and responsively projects on the display 205 (FIG. 2) the transcript 112, as projected transcript 122. (As elsewhere herein, the processor 215 may process the transcript data structure 117 instead of the raw transcript 112.)

Either before or after before the transcript 112 is generated the user of the apparatus 210 may specify categories of information to be automatically recognized and extracted from the transcript 112. (In alternative embodiments, the voice communication 105 or voice communication data structure 119 is the source material processed instead of the transcript 112 or data structure 117, under control of the speech recognition function 110, for recognition and extraction.) The categories of information specified include names, phone numbers, postal addresses, e-mail addresses, URL's, etc. The user is not limited to specifying categories of information to be recognized and extracted, but may also specify very specific information. For example, the user may specify extraction of a certain name, number, word, group of names, numbers, words, or combinations thereof or text within a certain range of occurrence thereof. The raw transcript 112 (or data structure 117) is accordingly processed, controlled by a first editing function 131 portion of the instructions, to responsively recognize and extract the specified information, thereby generating extracted information 135.

The user may also specify information to be extracted interactively. That is, the user may highlight on display 205 (FIG. 2) information shown as projected transcript 122, using a stylus on the touch sensitive screen or keys, and direct the editing function 135 to extract and save the selected information.

The processor 215 processes the extracted information 135, under the control of a second editing function 132 portion of instructions for the program(s) 237, to generate formatted information 137, which is a structured version of the extracted information 135 that is formatted to be compatible with an organizer function 150 or some external function or device. The processor 215 is operable to transfer the information 137 via I/O adapter 244 (FIG. 2), controlled by the previously mentioned transfer function 140.

Under control of the organizer function 150 portion of instructions for the program(s) 237, the processor 215 processes organizer data 155, which generally includes data such as names, addresses, lists of things to do, notes, calendar related information, etc. that has been input by a user and stored in memory 220 (FIG. 2). Responsive to the organizer function 150 processing, the data 155 is merged with the formatted information 137 arising from the voice communication 260. This produces merged organizer data 156, which includes structured information organized according to function in sections including address book, "to do" list, notepad, calendar, etc. The processor 215 processes the merged organizer data 156, controlled by the previously mentioned display function 120, and responsively projects the data 156 as projected merged organizer data 158 on the display 205 (FIG. 2). That is, the user may select from all the merged organizer data 156 any portion to be displayed as projected merged organizer data 158.

Figure 3:
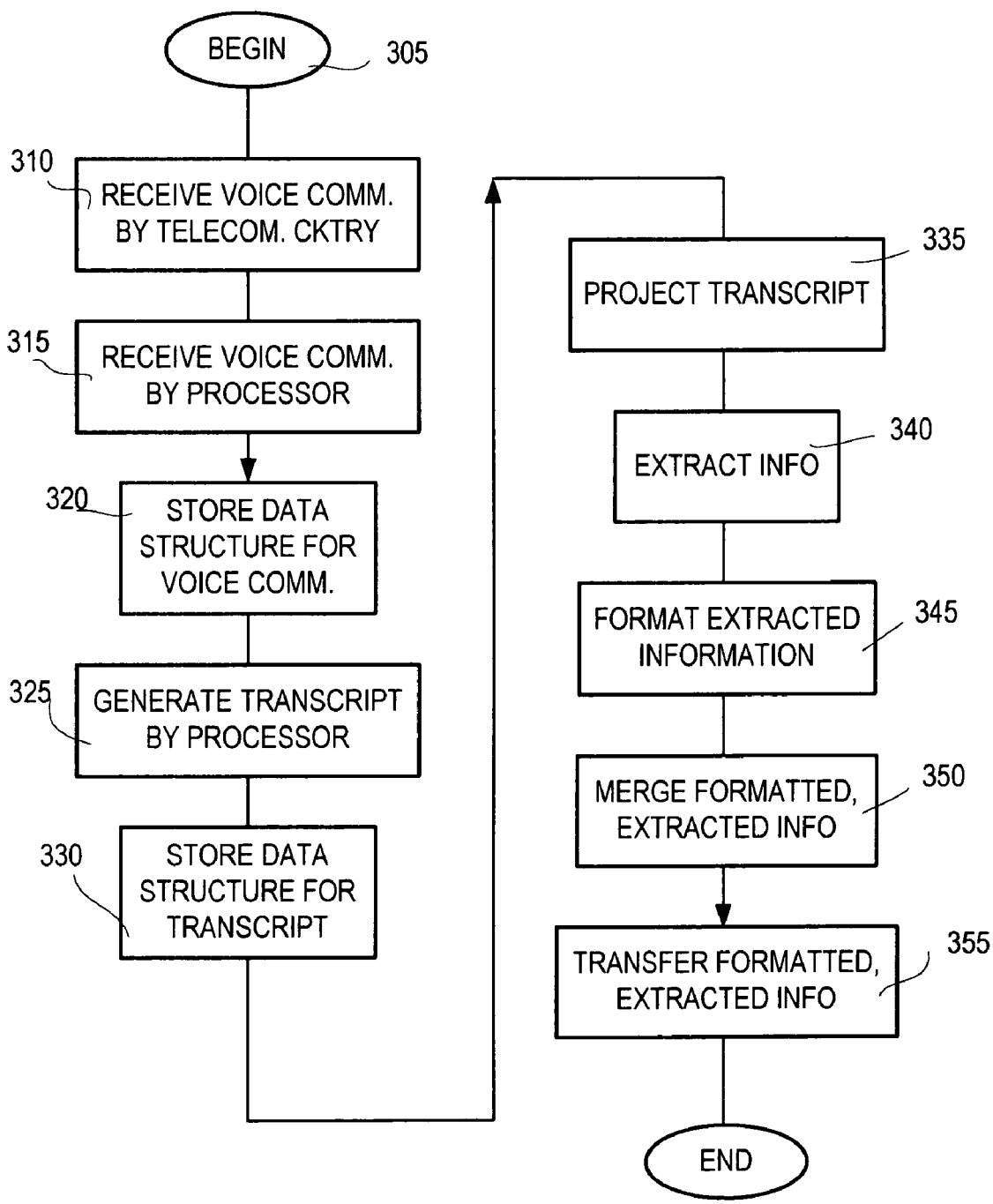
FIG. 3 illustrates an algorithm for the present invention in flow chart form, according to an embodiment.

Referring now to FIG. 3, a flow chart 300 is shown which illustrates method aspects of the invention more generally, according to an embodiment. It should be understood that the actions in the flow chart 300 do not necessarily have to be performed in the particular sequence in which they are set out. The method begins at block 305, and then at 310 telecommunications circuitry of the apparatus receives a voice communication from a cell phone network. As previously indicated, a processor is communicatively coupled to the telecommunications circuitry. Next, at 315 the voice communication is received by a processor of the apparatus. At 320 a data structure for the voice communications is stored by the processor in the memory. Then, at 325 a transcript of the voice communications is generated by the processor under control of speech recognition program instructions stored in a memory of the apparatus. At 330 a data structure for the transcript is stored by the processor in the memory.

At 335 the transcript is projected on a display of the apparatus responsive to processing the transcript by the processor. Next, at 340 information is extracted from the transcript by the processor. This may be in response to a user selection of the information. That is, for example, the processor receives a selection indicated by the user on the display-projected transcript. Alternatively, the information may be extracted from the transcript automatically by the processor in response to a specification entered by the user, typically, although not necessarily, before the transcript is even generated.

Next, at 345 the extracted information is formatted, such as to generate a data structure for the information conforming to a required format for an organizer application that may run on the same processor, or to conform to a format for some other application or device, which may or may not be external to the apparatus. At 350 the formatted, extracted information is merged with organizer data. At 355 the information is transferred to another device or application. As previously described in connection with FIG. 1, this tranferring may include transferring a formated version of the transcript or excerpts therefrom to a printer for printing, transferring the transcript or excerpts therefrom as a data structure such as in a text file or word processing file format attached to an e-mail, uploaded to a web site, beamed to another device, etc., transferring an audio file of the voice communication or excerpts therefrom, etc.

The description of the present embodiment has been presented for purposes of illustration, but is not intended to be exhaustive or to limit the invention to the form disclosed. Many modifications and variations will be apparent to those of ordinary skill in the art. For example, those of ordinary skill in the art will appreciate that processes of the present invention are capable of being performed by a processor responsive to stored instructions, and accordingly some or all of the processes may be distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

It should be understood, of course, that the functions and data structures shown in FIG. 1 are generated and parsed in different ways in different embodiments. For example, the raw transcript 112 and the transcript data structure 117 are one and the same in another embodiment. Also, for example, the transcript data structure 117 is generated responsive to the speech recognition function 110 instructions rather than separate utility function 115 instructions in another embodiment.

From the above it should be appreciated that the telecommunications/transcription combination of the present invention reduces the need for the user to try and write with pen and paper while talking on the phone. The invention also advantageously provides the capability to easily capture portions of voice communication, convert them from an audio format to a text-based format, and transfer them into any selected section of the organizer data 156 or to an external device with only a few keystrokes, button presses or stylus taps. Moreover, if the user specifies in advance the information to be captured, the information may even be captured and transferred automatically, with no further user intervention at all.

Increased accuracy as compared to the conventional pen-and-paper-while-talking approach is another advantage of the automatic transcription and selective data capture enabled by the invention. This leads to significant cost savings through error reduction. Manually mis-transcribing a digit in a contract number, for example, can lead to incorrect billing and consequent delays in receiving payment.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. An apparatus for cell phone communication comprising:
   telecommunications circuitry operable to wirelessly send and receive voice communications directly to and from a cell phone network;
   a processor communicatively coupled to the telecommunications circuitry for receiving the voice communications;
   a memory, wherein the memory has program instructions for speech recognition stored therein and the processor is operable under control of the speech recognition program instructions to generate a transcript of the voice communications; and
   a display, wherein the memory has program instructions for a display function and the processor is operable under control of the display program instructions to project the transcript on the display and wherein the apparatus is of a size and weight that is suitable to be carried easily in a pocket or purse, wherein the memory has program instructions for an editing function stored therein, and the processor is operable under control of the editing program instructions to automatically selectively extract information from the transcript.

2. The apparatus of claim 1, wherein the memory has program instructions for a transfer function and wherein the processor is operable under control of the transfer function program instructions to transfer the transcript for printing.

3. The apparatus of claim 1, wherein the memory has program instructions for a utility function stored therein, and the processor is operable under control of the utility program instructions to store a data structure for the transcript in the memory.

4. The apparatus of claim 1, wherein the memory has program instructions for a utility function stored therein, and the processor is operable under control of the utility program instructions to store a data structure for the voice communications in the memory.

5. The apparatus of claim 1, wherein the processor is operable under control of the editing program instructions to format the extracted information for transferring to other applications.

6. An apparatus for cell phone communication comprising:
   telecommunications circuitry operable to wirelessly send and receive voice communications directly to and from a cell phone network;
   a processor communicatively coupled to the telecommunications circuitry for receiving the voice communications;
   a memory, wherein the memory has program instructions for speech recognition stored therein and the processor is operable under control of the speech recognition program instructions to generate a transcript of the voice communications; and
   a display, wherein the memory has program instructions for a display function and the processor is operable under control of the display program instructions to project the transcript on the display and wherein the apparatus is of a size and weight that is suitable to be carried easily in a pocket or purse, wherein the memory has program instructions for an editing function and for an organizer function stored therein, and the processor is operable under control of the editing program instructions to automatically selectively extract information from the transcript, under control of the organizer program instructions to merge the formatted, extracted information with the organizer data, and under control of the display instructions to project the organizer data on the display.

7. A method for capturing information in cell phone communication, the method comprising the steps of:
   receiving wirelessly a voice communication directly from a cell phone network, wherein the receiving is by telecommunications circuitry of an apparatus of a size and weight that is suitable to be carried easily in a pocket or purse;
   receiving the voice communications by a processor of the apparatus, the processor being communicatively coupled to the telecommunications circuitry;
   generating a transcript of the voice communications by the processor under control of speech recognition program instructions stored in a memory of the apparatus; and
   projecting the transcript on a display of the apparatus responsive to processing the transcript by the processor, wherein the processor performs the step of:
   extracting information from the transcript automatically and selectively by the processor in response to editing program instructions stored in the memory.

8. The method of claim 7, comprising the step of:
   transferring the transcript for printing, wherein the transferring includes processing by the processor under control of transfer function program instructions stored in the memory.

9. The method of claim 7, comprising the step of:
   extracting information from the transcript by the processor in response to a user selection of the information, the selection being indicated by the user on the display-projected transcript.

10. A method for capturing information in cell phone communication, the method comprising the steps of:
    receiving wirelessly a voice communication directly from a cell phone network, wherein the receiving is by telecommunications circuitry dan apparatus of a size and weight that is suitable to be carried easily in a pocket or purse;
    receiving the voice communications by a processor of the apparatus, the processor being communicatively coupled to the telecommunications circuitry;
    generating a transcript of the voice communications by the processor under control of speech recognition program instructions stored in a memory of the apparatus; and
    projecting the transcript on a display of the apparatus responsive to processing the transcript by the processor, wherein the processor performs the steps of:
    extracting information from the transcript;
    formatting the extracted information; and
    merging the formatted, extracted information with organizer data.

11. The method of claim 7, wherein the processor performs the step of:
    formatting the extracted information in response to the editing program instructions stored in the memory for transferring to other applications.

12. The method of claim 7, wherein the processor performs the step of:
    storing a data structure for the transcript in the memory.

13. The method of claim 7, wherein the processor performs the step of:
    storing a data structure for the voice communication in the memory.

14. A computer program product for capturing information in a voice communication, the communication being received wirelessly directly from a cell phone network, wherein the receiving is by telecommunications circuitry of an apparatus, wherein the apparatus is of a size and weight that is suitable to be carried easily in a pocket or purse and a processor of the apparatus communicatively coupled to the telecommunications circuitry receives the voice communication, the computer program product comprising instructions stored in a memory of the apparatus for causing the processor to perform the steps of:

generating a transcript of the voice communications;

projecting the transcript on a display of the apparatus responsive to processing the transcript by the processor; extracting information from the transcript;

formatting the extracted information; and merging the formatted, extracted information with organizer data.

15. The computer program product of claim 14, comprising:

instructions for transferring the transcript for printing, including transfer function program instructions for processing by the processor.

16. The computer program product of claim 14, comprising:

instructions for receiving byte processor a selection from a user of a portion of the transcript, the selection being indicated by the user on the display-projected transcript; and instructions for causing the processor to extract the selected information from the transcript.

17. The computer program product of claim 14, comprising instructions for causing the processor to perform the step of:

formatting the extracted information in response to the editing program instructions stored in the memory for transferring to other applications.

18. The computer program product of claim 14, comprising instructions for causing the processor to perform the step of:

storing a data structure for the transcript in the memory.

19. The computer program product of claim 14, comprising instructions for causing the processor to perform the step of:

storing a data structure for the voice communication in the memory.

* * * * *